US011356901B2

(12) United States Patent
Wang et al.

(10) Patent No.: US 11,356,901 B2
(45) Date of Patent: Jun. 7, 2022

(54) IN-FLIGHT COMMUNICATION AND METHOD FOR IMPROVED QUALITY OF SERVICE FOR 5G NETWORK

(71) Applicant: Aero5G, Inc., Poway, CA (US)

(72) Inventors: Jun Wang, Poway, CA (US); Bin Liu, Poway, CA (US)

(73) Assignee: Aero5G, Inc., Poway, CA (US)

( * ) Notice: Subject to any disclaimer, the term of this patent is extended or adjusted under 35 U.S.C. 154(b) by 0 days.

(21) Appl. No.: 17/043,262

(22) PCT Filed: Dec. 18, 2019

(86) PCT No.: PCT/US2019/067288
§ 371 (c)(1),
(2) Date: Sep. 29, 2020

(87) PCT Pub. No.: WO2020/132145
PCT Pub. Date: Jun. 25, 2020

(65) Prior Publication Data
US 2021/0022046 A1    Jan. 21, 2021

Related U.S. Application Data

(60) Provisional application No. 62/781,467, filed on Dec. 18, 2018.

(51) Int. Cl.
*H04W 4/00*       (2018.01)
*H04W 28/26*     (2009.01)
*H04W 4/42*       (2018.01)
*H04B 7/185*      (2006.01)
*H04W 12/06*     (2021.01)

(52) U.S. Cl.
CPC ........ *H04W 28/26* (2013.01); *H04B 7/18506* (2013.01); *H04W 4/42* (2018.02); *H04W 12/06* (2013.01)

(58) Field of Classification Search
None
See application file for complete search history.

(56) References Cited

U.S. PATENT DOCUMENTS

| | | | |
|---|---|---|---|
| 7,519,014 B2 | 4/2009 | Allen et al. | |
| 2003/0093798 A1 | 5/2003 | Rogerson | |
| 2018/0316428 A1* | 11/2018 | Barritt | H04B 10/1129 |
| 2018/0324662 A1* | 11/2018 | Phuyal | H04B 7/15507 |
| 2018/0343054 A1* | 11/2018 | Barritt | H04B 7/18504 |
| 2019/0289613 A1* | 9/2019 | Fanelli | H04W 28/26 |
| 2020/0372811 A1* | 11/2020 | Lindqvist | B64C 39/024 |
| 2021/0103294 A1* | 4/2021 | Mahkonen | G05D 1/0038 |

FOREIGN PATENT DOCUMENTS

| | | |
|---|---|---|
| CN | 102938670 | 2/2013 |
| WO | WO2017013417 | 1/2017 |
| WO | WO2018033198 | 2/2018 |

\* cited by examiner

*Primary Examiner* — Khalid W Shaheed
(74) *Attorney, Agent, or Firm* — CP Law Group PC; Cy Bates

(57) ABSTRACT

A system and method is configured to prepare and implement resource reservation over a plurality of cells along a flight path for enhancing Quality of Service for in-flight communication.

17 Claims, 11 Drawing Sheets

```
MIB ::=                             Sequence {
    SystemFrameNumber                   Bit String (Size(6)),
    SubCarrierSpacingCommon             Enumerated {scs15or60, scs30or120},
    ssb-SubcarrierOffset                Integer (0..15),
    dmrs-Type A-Position                Enumerated {pos2, pos3},
    pdcch-ConfigSIB1                    Integer (0..255),
    CellBarred                          Enumerated {barred, notBarred},
    IntraFreqReselection                Enumerated {allowed, notallowed},
    Spare                               Bit String (Size (1))
}
```

IN-FLIGHT COMMUNICATION AND METHOD FOR IMPROVED QUALITY OF SERVICE FOR 5G NETWORK

TECHNICAL FIELD

The invention relates to methods for improved Quality of Service (QoS) for in-flight communication; and more particularly, to a method for reserving bandwidth for use with in-flight communication and thereby improving QoS.

DESCRIPTION OF THE RELATED ART 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G networks can provide high speed data and throughput, high reliability, low latency, high capacity, full availability and fast connectivity, and dynamic bandwidth allocation from the 5G radio access networks (RAN).

5G QoS parameters are targeted as follows: (i) speed/throughput is increased to 10 Gbps, and target of 20 Gbps; (ii) reliability parameters like block error ratio is expected to be 0.001% in a 1 millisecond period; (iii) end-to-end latency is reduced to a range of 1-10 milliseconds and physical network latency is reduced to 0.5 milliseconds; (iv) network availability is designed to 100%; (v) jitter is brought down to 10-100 microseconds; and (vi) bandwidth allocation is from 100 Kbps for small sensor devices to several hundred megabits per second for industrial high bandwidth applications.

SUMMARY

Technical Problem

Flight communications, if not offered with guaranteed QoS, may result in one of a plurality of possible issues. The link between the flight user equipment (FUE) and the 5G radio access node (gNB) is critical for flight communication, including inside the flight. The QoS guarantee on the link is very important for the experience of in-flight users and/or equipment.

The has yet to be proposed a solution for optimizing QoS for in-flight communication; more particularly, by way of resource reservation techniques among other useful solutions.

Solution to Problem

It is herein proposed that QoS can be enhanced by following aspects:
resource reservation—methods that reserve bandwidth in advance or dynamically for flight use;
flight tracking and resource updates—methods that achieve flight location tracking and prediction;
cell differentiation—methods for differentiating cells for dedicated flight use, regular use, or shared use; and
flight users/equipment differentiation—methods for differentiating FUE from the regular user equipment (UE), military user equipment (MUE), and the like.

Advantageous Effects of Invention

The invention enables improved QoS for in-flight communication over a 5G network thereby enhancing communication onboard the aircraft and between air to ground link.

BRIEF DESCRIPTION OF THE DRAWINGS

The detailed description is described with reference to the accompanying figures of the drawings. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION OF THE PREFERRED EMBODIMENTS

Figure 1:
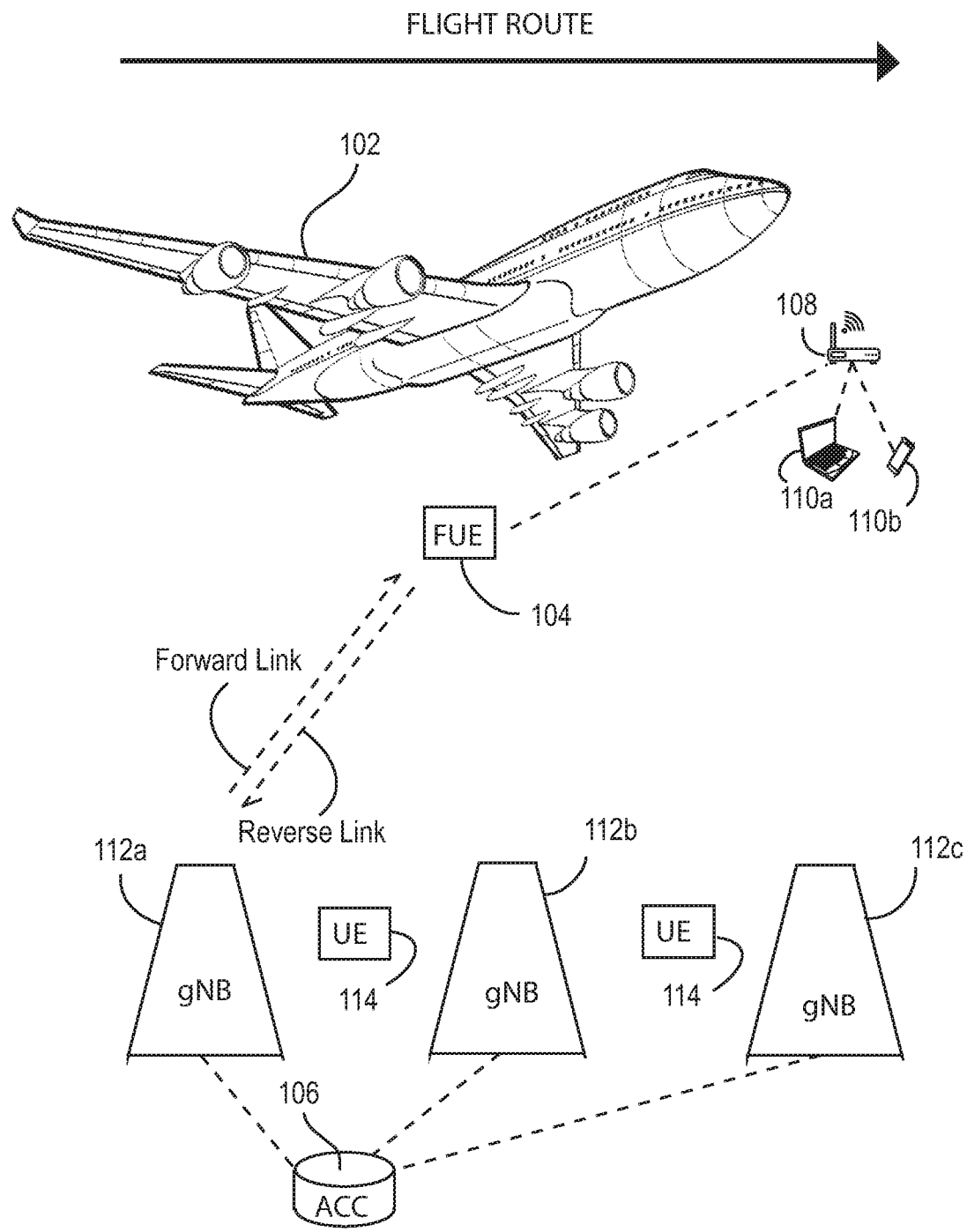
FIG. 1 is a diagrammatic representation of a network architecture including an embodiment of an aircraft communication system.

In the following description, for purposes of explanation and not limitation, details and descriptions are set forth in order to provide a thorough understanding of the embodiments of the invention. However, it will be apparent to those skilled in the art that the present invention may be practiced in other embodiments, including certain variations or alternative combinations that depart from these details and descriptions. The examples disclosed herein are intended to enable those with skill in the art to practice the invention, but such examples shall not reasonably be construed as limiting the spirit and scope of the invention as-claimed.

Now, in accordance with a first embodiment, a method is disclosed for reserving bandwidth for use with in-flight communication, comprising:

establishing a communication channel between a flight user equipment and a network entity;

transmitting, from the flight user equipment to the network entity, a flight resource preparation request associated with a select flight, the flight resource preparation request comprising: a flight route associated with the select flight, or the flight route and a flight schedule associated with the select flight; and receiving, at the flight user equipment, a flight resource preparation response, the flight resource preparation response comprising a list of a plurality of network nodes identified by the network entity as being disposed along the flight route;

wherein at least one of the flight user equipment and the network entity is configured to select, from the flight resource preparation response, the plurality of network nodes or a sub-set thereof for allocating in-flight communication resources.

The network entity may comprise an aero communication controller (ACC), a radio access node (including a ground base station, balloon base station, or other base station), or a combination thereof. The ACC, or any radio access node of the network, may be central or distributed.

The process for establishing a communication channel between the flight user equipment and the network entity may further comprise: performing a radio resource control connection between the flight user equipment and the network entity; and performing a mutual authentication between the flight user equipment and the network entity.

The method in the first embodiment may further comprise: transmitting, from the flight user equipment to the network entity, a flight user equipment type associated with the select flight, the flight user equipment type being one from the group consisting of: military, civilian, or drone.

The flight user equipment type may be transmitted to the network entity via radio resource control signaling. Alternatively, the flight user equipment type can be transmitted to the network entity via non-access stratum signaling.

The method in the first embodiment may further comprise: transmitting, from the flight user equipment to the network entity, a location of the flight user equipment. In this regard, the location of the flight user equipment can be transmitted periodically during the select flight; i.e. it may be "automated". Alternatively, the location of the flight user equipment can be transmitted upon the flight user equipment receiving a request for location initiated from the network entity; i.e. it may be "responsive".

The method in the first embodiment may further comprise: receiving, at the flight user equipment, a node type associated with each of the plurality of network nodes, the node type being one from the group consisting of: dedicated flight cell; dedicated non-flight cell; or shared cell. The node type may be received at the flight user equipment by one of: subscription, pre-configuration, master information block, synchronization signal, and system information block.

In a second embodiment, a method is disclosed for reserving bandwidth for use with in-flight communication, comprising:

establishing a communication channel between a flight user equipment and a network entity;

receiving, at the network entity, a flight resource preparation request associated with a select flight, the flight resource preparation request comprising: a flight route associated with the select flight, or the flight route and a flight schedule associated with the select flight; and transmitting, from the network entity to the flight user equipment, a flight resource preparation response, the flight resource preparation response comprising a list of a plurality of network nodes identified by the network entity as being disposed along the flight route;

wherein at least one of the flight user equipment and the network entity is configured to select, from the flight resource preparation response, the plurality of network nodes or a sub-set thereof for allocating in-flight communication resources.

The network entity may comprise an aero communication controller, a radio access node, or a combination thereof.

In the second embodiment, the process for establishing a communication channel between the flight user equipment and the network entity may further comprise: performing a radio resource control connection between the flight user equipment and the network entity; and performing a mutual authentication between the flight user equipment and the network entity.

In the second embodiment, the method may further comprise: receiving, at the network entity, a flight user equipment type associated with the select flight, the flight user equipment type being one from the group consisting of: military, civilian, or drone.

The flight user equipment type can be transmitted to the network entity via radio resource control signaling or non-access stratum signaling.

The method in the second embodiment may further comprise: receiving, at the network entity, a location of the flight user equipment. The location of the flight user equipment can be received periodically during the select flight. Alternatively, the location of the flight user equipment can be received in response to a request for location initiated from the network entity.

The method in the second embodiment may further comprise: transmitting, from the network entity to the flight user equipment, a node type associated with each of the plurality of network nodes, the node type being one from the group consisting of: dedicated flight cell; dedicated non-flight cell; or shared cell.

The node type can be transmitted in one of: subscription, pre-configuration, master information block, synchronization signal, and system information block.

In any of the first and second embodiments, the method may further comprise:

establishing a communication channel between the aero communication controller and the radio access node of the network;

transmitting, from the radio access node to the aero communication controller, the flight resource preparation request, radio access node information, and up to each of: a flight user equipment type, a flight user equipment location, or a combination thereof;

receiving, at the radio access node, the flight resource preparation response, a flight resource update, or a combination thereof; and transmitting the flight resource preparation response, flight resource update, or combination thereof to the flight user equipment.

In a third embodiment, a system is disclosed for reserving bandwidth for use with in-flight communication, comprising:

at least one flight user equipment, and at least one network entity;

wherein:

the system is configured to execute a method including the steps of:

establishing a communication channel between the flight user equipment and the network entity;

receiving, at the network entity, a flight resource preparation request associated with a select flight, the flight resource preparation request comprising: a flight route associated with the select flight, or the flight route and a flight schedule associated with the select flight; and transmitting, from the network entity to the flight user equipment, a flight resource preparation response, the flight resource preparation response comprising a list of a plurality of network nodes identified by the network entity as being disposed along the flight route;

wherein at least one of the flight user equipment and the network entity is configured to select, from the flight resource preparation response, the plurality of network nodes or a sub-set thereof for allocating in-flight communication resources.

As in the first and second embodiments, in the third embodiment the network entity may comprise an aero communication controller, a radio access node, or a combination thereof.

The aero communication controller (ACC) is a new entity introduced to control the flight communication, including resource reservation and QoS management. The ACC can be centralized or distributed. The flight user equipment (FUE) may form a connection to ACC via, for example and without limitation, HTTPS, or SNMPv3. The domain name of the ACC is pre-configured to the FUE.

For purposes herein, the examples may reference a "cellular ground network" or "ground base station" for illustrating an exemplary embodiment; however, it will be understood by one having skill in the art that the invention applies to any implementation of 5G network, and ground base station can be substituted for balloon or other base station or radio access node known in the art.

Now turning to the figures of the drawing, FIG. 1 shows a diagrammatic representation of a network architecture 100 including an embodiment of an aircraft communication system. The aircraft communication system includes flight user equipment (FUE, 104) disposed onboard an aircraft 102 and an aero communication controller (ACC, 106) located remotely from the aircraft. In an embodiment, the aero communication controller 106 is located on the ground; however, as disclosed herein the ACC may be centralized or distributed on ground or otherwise. The flight user equipment 104 is configured to be communicatively coupled to the aero communication controller 106 via the 5G network.

Examples of flight user equipment 104 include, but are not limited to, civilian flight user equipment, military flight user equipment, drone flight user equipment, and other flight user equipment.

The flight user equipment 104 is configured to provide one or more wireless access points 108 onboard the aircraft 102. The one or more wireless access points 108 are configured to be communicatively coupled to one or more user equipment 110a, 110b onboard the aircraft 102. Examples of user equipment 110a, 110b include, but are not limited to, mobile computing devices and mobile communication devices. Examples of mobile computing devices and/or mobile communication devices include, but are not limited to, laptops 110a, cell phones 110b and tablets (not shown).

The cellular ground network includes a plurality of ground base stations 112a, 112b, 112c. The plurality of ground base stations 112a, 112b, 112c are configured to be communicatively coupled to the flight user equipment 104 and to the aero communication controller 106. In an embodiment, the one or more of the plurality of ground base stations 112a, 112b, 112c are configured to be communicatively coupled to ground user equipment 114. Example of ground user equipment 114 include, but are not limited to, communication devices, computing devices, mobile computing devices and mobile communication devices. Examples of such devices include, but are not limited to, computers, cell phones, laptops, servers, and tablets.

In an embodiment, one or more of the plurality of ground base stations 112a, 112b, 112c are configured to be communicatively coupled only to ground user equipment 114. Such type of ground base stations are called Dedicated non-flight cell (or dedicated non-flight ground base station). In this embodiment, the ground based stations only serve the regular ground UEs or serves the FUE as regular ground UEs. The FUE connects this ground base station only when it cannot connect with other two types of cells. In this case, the FUE will keep searching the other two types of cells. In an embodiment, one or more of the plurality of ground base stations 112a, 112b, 112c are configured to be communicatively coupled only to the flight user equipment 104 and to the aero communication controller 106, Such type of ground base stations are called Dedicated flight cell (or Dedicated ground base stations). In another embodiment, one or more of the plurality of ground base stations 112a, 112b, 112c are configured to be communicatively coupled to both ground user equipment 114 and the flight user equipment 104. Such type of ground base stations are called Shared cell (or shared ground base stations).

In embodiment, one or more of the plurality of ground base stations 112a, 112b, 112c are configured to be communicatively coupled to ground user equipment 114, to the flight user equipment, and to the aero communication controller 106. While the plurality of ground base stations 112a, 112b, 112c is shown as including three ground base stations 112a, 112b, 112c, the plurality of ground base stations may include a fewer or greater number of ground base stations.

The aero communication controller 106 is configured to be communicatively coupled with one or more of the plurality of ground base stations 112a, 112b, 112c. The aero communication controller 106 is configured to be communicatively coupled to the flight user equipment 104 via one or more of the plurality of ground base stations 112a, 112b, 112c. In an embodiment, the aero communication controller 106 is a centralized system. In an embodiment, the aero communication controller 106 is a distributed system.

The aero communication controller 106 is configured to manage communications between the flight user equipment 104 and one or more of the plurality of ground base stations 112a, 112b, 112c as the aircraft 102 progresses along the flight route 116. In an embodiment, the management of communications between the flight user equipment 104 and one or more of the plurality of ground base stations 112a, 112b, 112c enables user equipment 110a, 110b to communicate with ground user equipment 114 via the flight user equipment 104 and one or more of the plurality of ground base stations 112a, 112b, 112c as the aircraft 102 progresses along the flight route 116. In an embodiment, the aero communication controller 106 receives a flight resource preparation request from the flight user equipment 104. The flight resource preparation request includes the flight route 116 and the flight schedule associated with a flight. The aero communication controller 106 identifies specific ground base stations 112a, 112b, 112c that are disposed along the flight route 116 with the resources available to support communications between the flight user equipment 104 and ground user equipment 114 as the aircraft 102 progresses along the flight route 116. The aero communication controller 106 reserves the resources at the identified ground base stations 112a, 112b, 112c and provides a list of the identified ground base stations to the flight user equipment 104.

In an embodiment, the management of communications between the flight user equipment 104 and one or more of the plurality of ground base stations 112a, 112b, 112c enables the aero communication controller 106 to track the aircraft 102 as the aircraft 102 progresses along the flight route 116. In an embodiment, the aero communication controller 106 receives a flight resource preparation request from the flight user equipment 104. The flight resource preparation request includes the flight route 116 and the flight schedule associated with a flight. The aero communication controller 106 identifies specific ground base stations 112a, 112b, 112c that are disposed along the flight route 116.

As the aircraft 102 progresses along the flight route 116, the flight user equipment 104 successively comes within communication range of each of the identified ground base stations 112a, 112b, 112c. As the flight user equipment 104 comes within communication range of each of the identified ground base stations 112a, 112b, 112c, the flight user equipment 104 transmits location data to the ground base station 112a, 112b, 112c. The ground base stations 112a, 112b, 112c transmit the received location data to the aero communication controller 106. Alternatively, the flight user equipment 104 transmits location data to the aero communication controller 106 via upper layer signaling. Should the flight user equipment 104 fails to transmit location data within the time window that the aircraft 102 is expected to be within communication range of each of the identified base stations 112a, 112b, 112c, the aero communication controller 106 issues an alert to a flight control center indicating that the aircraft 102 may have deviated from the expected flight route 116 and/or experienced an unexpected delay. In an embodiment, the alert is an alarm.

Figure 2:
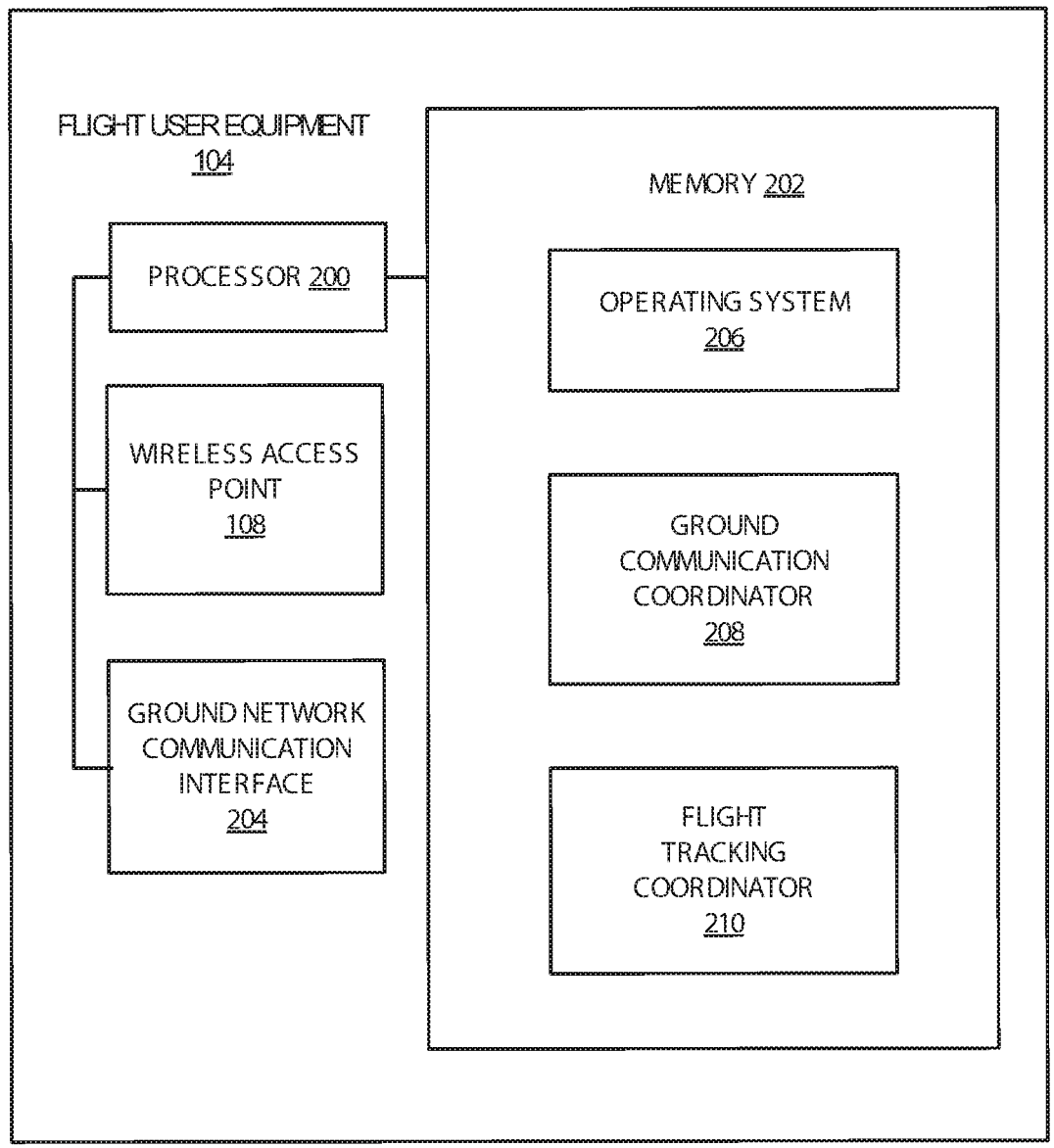
FIG. 2 is a block diagram representation of an embodiment of a flight user system.

Referring to FIG. 2, a block diagram representation of an embodiment of a flight user equipment 104 is shown. The flight user equipment 104 includes at least one processor 200, at least one memory 202, at least one wireless access point 108, and a ground network communication interface 204. The flight user equipment 104 may include other components that facilitate the operation of the flight user equipment 104. The at least one processor 200 may be microprocessors, controllers or any other suitable type of processors for processing computer executable instructions to control the operation of the flight user equipment 104.

The at least one memory 202 may include, for example, computer storage medium such as volatile and non-volatile, removable and non-removable media implemented in any method or technology for storage of information such as computer readable instructions, data structures, program modules or the like. The computer storage medium includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by the at least one processor 200. The computer storage medium should not be interpreted to be a propagating signal. The at least one memory 202 includes computer executable instructions that may be provided using any computer-readable media that is accessible by the at least one processor 200. Although the at least one memory 202 is shown within the flight user equipment 104, it will be appreciated by a person skilled in the art, that the at least one memory 202 may be distributed or located remotely and accessed via a network or other communication link.

An operating system 206, a ground communications coordinator 208, and a flight tracking coordinator 210 are stored in the at least one memory 202. The operating system 206 enables the ground communications coordinator 208, and the flight tracking coordinator 210 to be executed on the flight user equipment 104. Additional components may be stored in the at least one memory 202 that facilitate the operation of the flight user equipment 104.

The at least one wireless access point 108 is configured to be communicatively coupled to one or more user equipment 110a, 110b onboard the aircraft 102. The at least one wireless access point 108 is configured to receive data from and transmit data to the user equipment 110a, 110b. The at least one wireless access point 108 is communicatively coupled to the ground network communication interface 204. The at least one wireless access point 108 is configured to transmit data to and received data from the ground network communication interface 204.

The ground network communication interface 204 is communicatively coupled to the at least one wireless access point 108. The ground network communication interface 204 is configured to receive data from and transmit data to the at least one wireless access point 108. The ground network communication interface 204 is configured to be communicatively coupled to one or more of the plurality of ground base stations 112a, 112b, 112c in the cellular ground network. The ground network communication interface 204 is configured to receive data from and transmit data to one or more of the plurality of ground base stations 112a, 112b, 112c.

The functionality described herein can be performed, at least in part, by one or more hardware logic components. According to an embodiment, the flight user equipment 104 is configured by the program code when executed by the processor 200 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

While a number of different components of the flight user equipment 104 have been described, the flight user equipment 104 may include additional components that may facilitate the operation of the flight user equipment 104.

Figure 3:
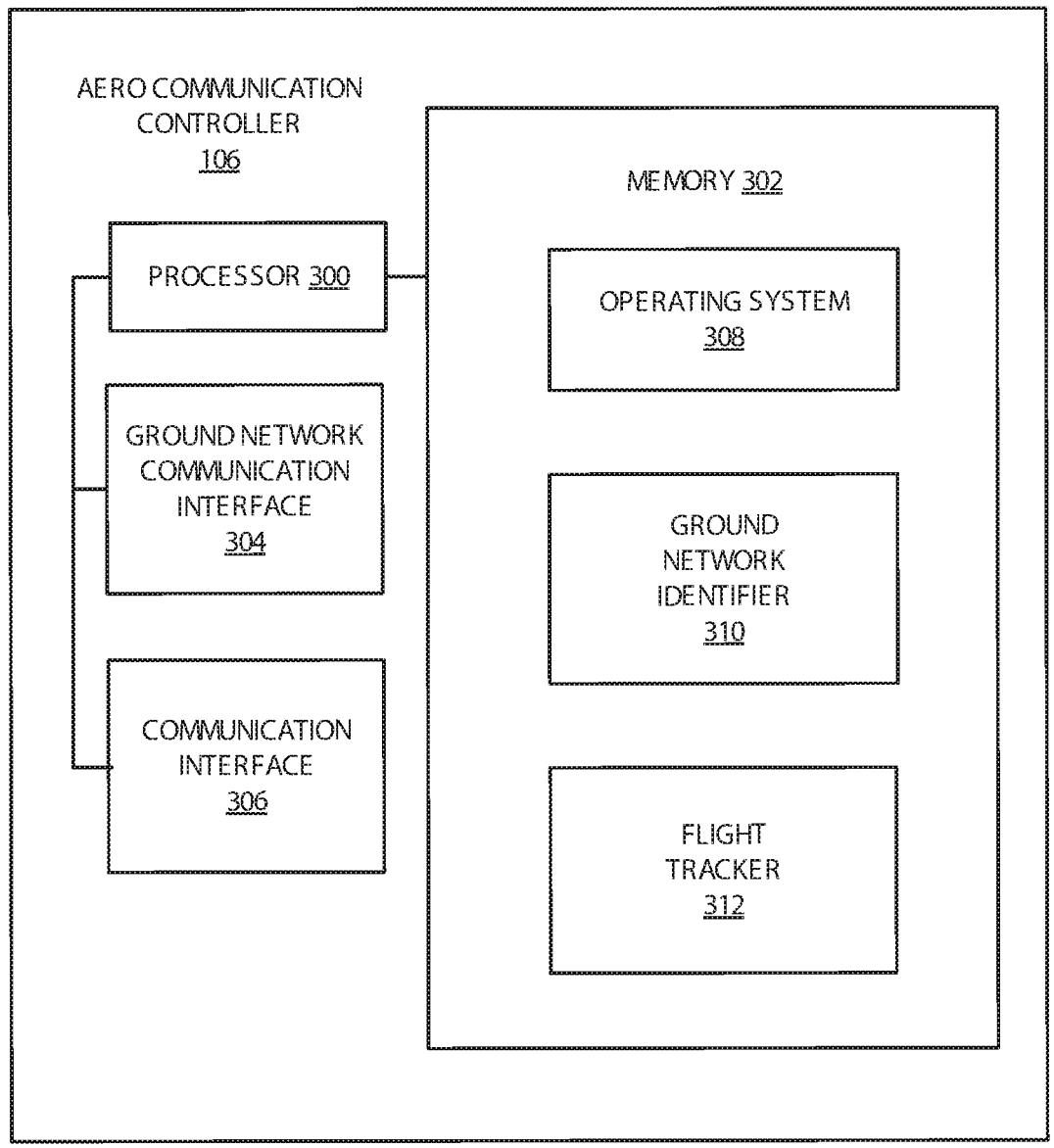
FIG. 3 is a block diagram representation of an embodiment of an aero communication controller.

Referring to FIG. 3, a block diagram representation of an embodiment of an aero communication controller 106 is shown. The aero communication controller 106 is configured to manage communications between the flight user equipment 104 and one or more of the plurality of ground base stations 112a, 112b, 112c as the aircraft 102 progresses along the flight route 116. In an embodiment, the management of communications between the flight user equipment 104 and one or more of the plurality of ground base stations 112a, 112b, 112c enables user equipment 110a, 110b to communicate with ground user equipment 114 via the flight user equipment 104 and one or more of the plurality of ground base stations 112a, 112b, 112c as the aircraft 102 progresses along the flight route 116. In an embodiment, the management of communications between the flight user equipment 104 and one or more of the plurality of ground base stations 112a, 112b, 112c enables the aero communication controller 106 to track the aircraft 102 as the aircraft 102 progresses along the flight route 116. In an embodiment, the aero communication controller 106 is a centralized system. In an embodiment, the aero communication controller 106 is a distributed system.

The aero communication controller 106 includes at least one processor 300, at least one memory 302, at least one ground network communication interface 304, and at least one communication interface 306. The aero communication controller 106 may include other components that facilitate the operation of the aero communication controller 106. The at least one processor 300 may be microprocessors, controllers or any other suitable type of processors for processing computer executable instructions to control the operation of the aero communication controller 106.

The at least one memory 302 may include, for example, computer storage medium such as volatile and non-volatile, removable and non-removable media implemented in any method or technology for storage of information such as computer readable instructions, data structures, program modules or the like. The computer storage medium includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by the at least one processor 300. The computer storage medium should not be interpreted to be a propagating signal. The at least one memory 302 includes computer executable instructions that may be provided using any computer-readable media that is accessible by the at least one processor 300. Although the at least one memory 302 is shown within the aero communication controller 106, it will be appreciated by a person skilled in the art, that the at least one memory 302 may be distributed or located remotely and accessed via a network or other communication link.

An operating system 308, a ground network identifier 310 and a flight tracker 312 are stored in the at least one memory 302. The operating system 308 enables the ground network identifier 310 and the flight tracker 312 to be executed on the aero communication controller 106. Additional components may be stored in the at least one memory 302 that facilitate the operation of the aero communication controller 106.

The at least one ground network communication interface 304 is configured to receive data from and transmit data to one or more of the plurality of ground base stations 112a, 112b, 112c in the cellular ground network. The at least one ground network communication interface 304 is configured to receive data from and transmit data to the flight user equipment 104 via one or more of the plurality of ground base stations 112a, 112b, 112c in the cellular ground network.

The at least one communication interface 306 is configured to receive data from and transmit data to one or more non-cellular entities. In an embodiment, the aero communication controller 106 is configured to communicate with a flight control center via the communication interface 306.

The functionality described herein can be performed, at least in part, by one or more hardware logic components. According to an embodiment, the aero communication controller 106 is configured by the program code when executed by the processor 300 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

While a number of different components of the aero communication controller 106 have been described, the aero communication controller 106 may include additional components that may facilitate the operation of the aero communication controller 106.

Figure 4:
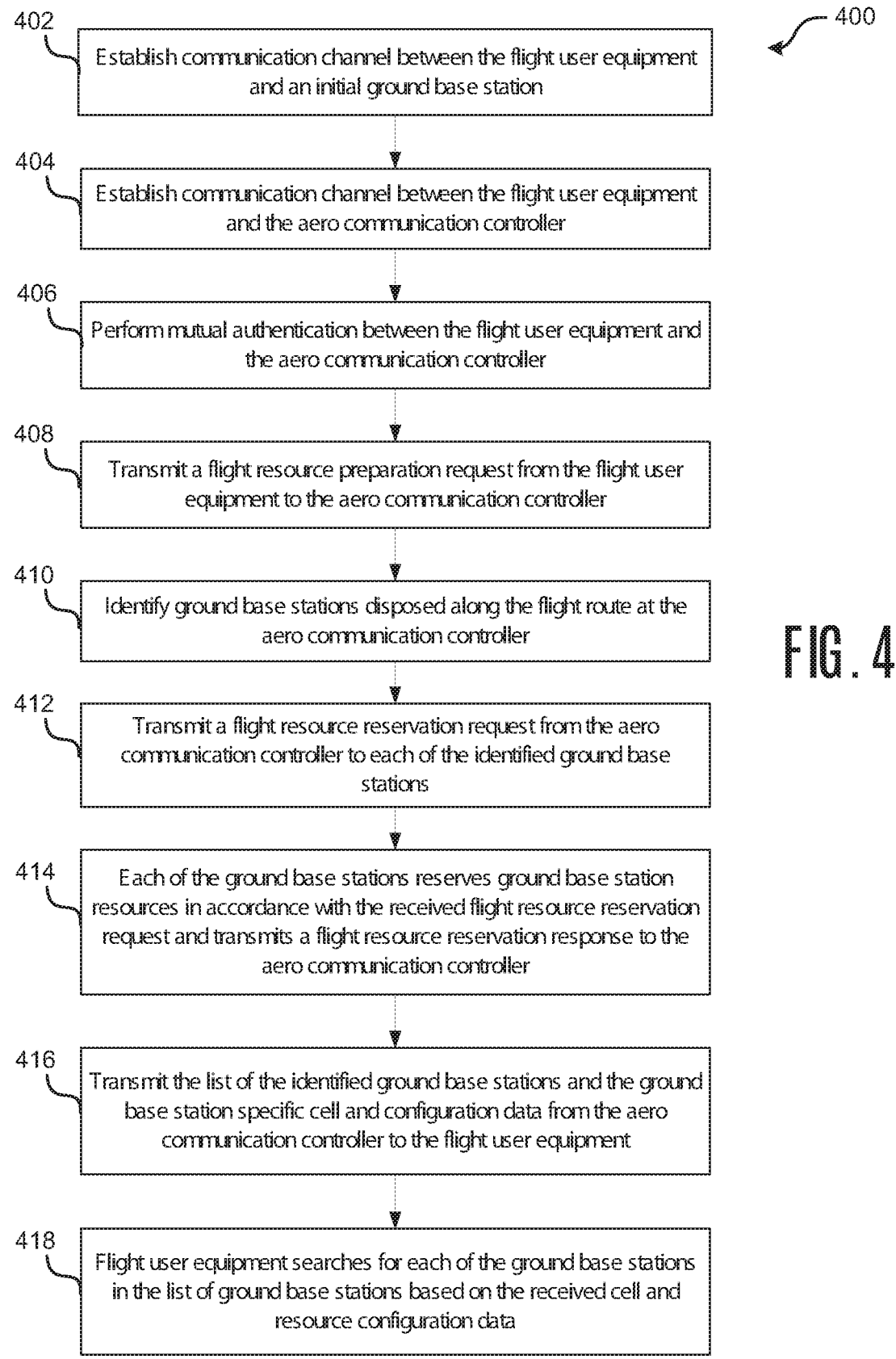
FIG. 4 a flow diagram representation of an example of a method of using an embodiment of an aircraft communication system to provide communication capability via a 5G network.

Referring to FIG. 4, a flow diagram representation of an example of a method 400 of using an embodiment of an aircraft communication system to provide communication capability via a ground base cellular network is shown. At 402, the flight user equipment 104 establishes a communication channel between the flight user equipment 104 and an initial ground base station 112a that is within communication range of the fight user equipment 104. In an embodiment, the ground communication coordinator 208 establishes the communication channel between the flight user equipment 104 and the initial ground base station 112a. In an embodiment, the flight user equipment 104 performs a resource reservation call set up with the initial ground base station 112a to establish the communication channel between the flight user equipment 104 and the initial ground base station 112a. The initial ground base station 112a is one of the plurality of ground base stations 112a, 112b, 112c.

At 404, the flight user equipment 104 issues a command to the aero communication controller 106 via the initial ground base station 112a to establish a communication channel between the flight user equipment 104 and the aero communication controller 106 via the initial ground station 112a. In an embodiment, the ground communication coordinator 208 issues the command to the aero communication controller 106 via the initial ground base station 112a to establish the communication channel between the flight user equipment 104 and the aero communication controller 106. In an embodiment, the flight user equipment 104 is preconfigured with the domain name of the aero communication controller 106. The flight user equipment 104 uses the domain name to establish the communication channel with the aero communication controller 106. In an embodiment, the flight user equipment 104 performs an aero communication controller 106 discovery via the initial ground base station 112a to establish the communication channel with the aero communication controller 106.

A mutual authentication is performed between the flight user equipment 104 and the aero communication controller 106 at 406. In an embodiment, the flight user equipment 104 transmits flight user equipment authentication data to the aero communication controller 106. The aero communication controller 106 receives the flight user equipment authentication data, authenticates the flight user equipment 104 based on the received flight user equipment authentication data, and transmits a confirmation of the authentication of the flight user equipment 104 to the flight user equipment 104. The aero communication controller 106 transmits aero communication controller authentication data to the flight user equipment 104. The flight user equipment 104 receives the aero communication controller authentication data, authenticates the aero communication controller 106 based on the received aero communication controller authentication data, and transmits a confirmation of the authentication of the aero communication controller 106 to the aero communication controller 106.

Upon successful mutual authentication, the flight user equipment 104 transmits a flight resource preparation request associated with a flight to the aero communication controller 106 at 408. In an embodiment, the ground communication coordinator 208 transmits the flight resource preparation request to the aero communication controller 106. In an embodiment, the flight resource preparation request includes the flight route 116 and the flight schedule associated with the flight. In an embodiment, the flight resource preparation request also includes one or more of flight identification data (e.g. flight number) and quality of service (QoS) levels. In an embodiment, the flight user equipment 104 activates a Data Network Name (DNN) and transmits the flight resource preparation request to the aero communication controller 106.

The aero communication controller 106 receives the flight resource preparation request and identifies the ground base stations 112a, 112b, 112c disposed along the flight route 116 at 410. In an embodiment, the ground network identifier 310 receives the flight resource preparation request and identifies the ground base stations 112a, 112b, 112c disposed along the flight route 116. In an embodiment the aero communication controller 106 identifies specific ground base stations 112a, 112b, 112c along the flight route 116 that have resources available to support communications in accordance with the flight schedule. In an embodiment the ground network identifier 310 identifies specific ground base stations 112a, 112b, 112c along the flight route 116 that have resources available to support communications in accordance with the flight schedule.

At 412, the aero communication controller 106 transmits a flight resource reservation request to reserve base station resources for use by the flight user equipment 104 in accordance with the flight schedule to each of the ground base stations 112a, 112b, 112c that have been identified as being disposed along the flight route 116. In an embodiment, the ground network identifier 310 transmits the flight resource reservation request to each of the ground base stations 112a, 112b, 112c that have been identified as being disposed along the flight route 116. The flight resource reservation request for each ground base station 112a, 112b, 112c identifies the time window that the flight user equipment 104 is expected to be within communication range of that ground base station 112a, 112b, 112c. In an embodiment, the flight resource reservation request includes flight identification data.

At 414, each of the ground base stations 112a, 112b, 112c reserves ground base station resources in accordance with the received flight resource reservation request and transmits a flight resource reservation response to the aero communication controller 106. In an embodiment, the flight resource reservation response is received at the ground network identifier 310. The flight resource reservation response includes ground base station specific cell and resource configuration data. The cell and resource configuration data may include one or more of geographic location of the ground base station, ground base station frequency, ground base station cell identification (e.g. PCI and CGI), and ground bases station beam information.

The aero communication controller 106 transmits the list of the ground base stations 112a, 112b, 112c that have been identified as being disposed along the flight route 116 and the ground base station specific cell and resource configuration data for each of the ground base stations 112a, 112b, 112c to the flight user equipment 104 at 416. In an embodiment the ground network identifier 310 transmits the list of the ground base stations 112a, 112b, 112c that have been identified as being disposed along the flight route 116 and the ground base station specific cell and resource configuration data for each of the ground base stations 112a, 112b, 112c to the flight user equipment 104.

At 418, the flight user equipment 104 searches for each of the ground base stations 112a, 112b, 112c in the list of ground base stations based on the received ground base station specific cell and resource configuration data. In an embodiment, each of the ground bases stations 112a, 112b, 112c searches for the flight user equipment 104 based on the flight identification data and the flight specific time window associated with that ground base station 112a, 112b, 112c. In an embodiment, the ground communication coordinator 208 searches for each of the ground base stations 112a, 112b, 112c in the list of ground base stations based on the received ground base station specific cell and resource configuration data.

In an embodiment, in the event of flight route and/or flight schedule changes, the method 400 can be repeated to dynamically update the allocation of ground base station resources to support the changes associated with the flight. Reserving ground base station bandwidth in advance or dynamically for use by the flight user equipment 104 provides user equipment 110a, 110b onboard the aircraft 102 with the ability to engage in communications with ground user equipment 114 via the ground base stations 112a, 112b, 112c as the flight user equipment 104 comes within communication range of each of the ground base stations 112a, 112b, 112c during a flight.

While a series of steps have been described in connection with the method 400, a fewer number of the described steps and/or additional steps may be performed. Furthermore, while the steps have been described in a particular order, the steps in method 400 may be performed in a different order.

Figure 5:
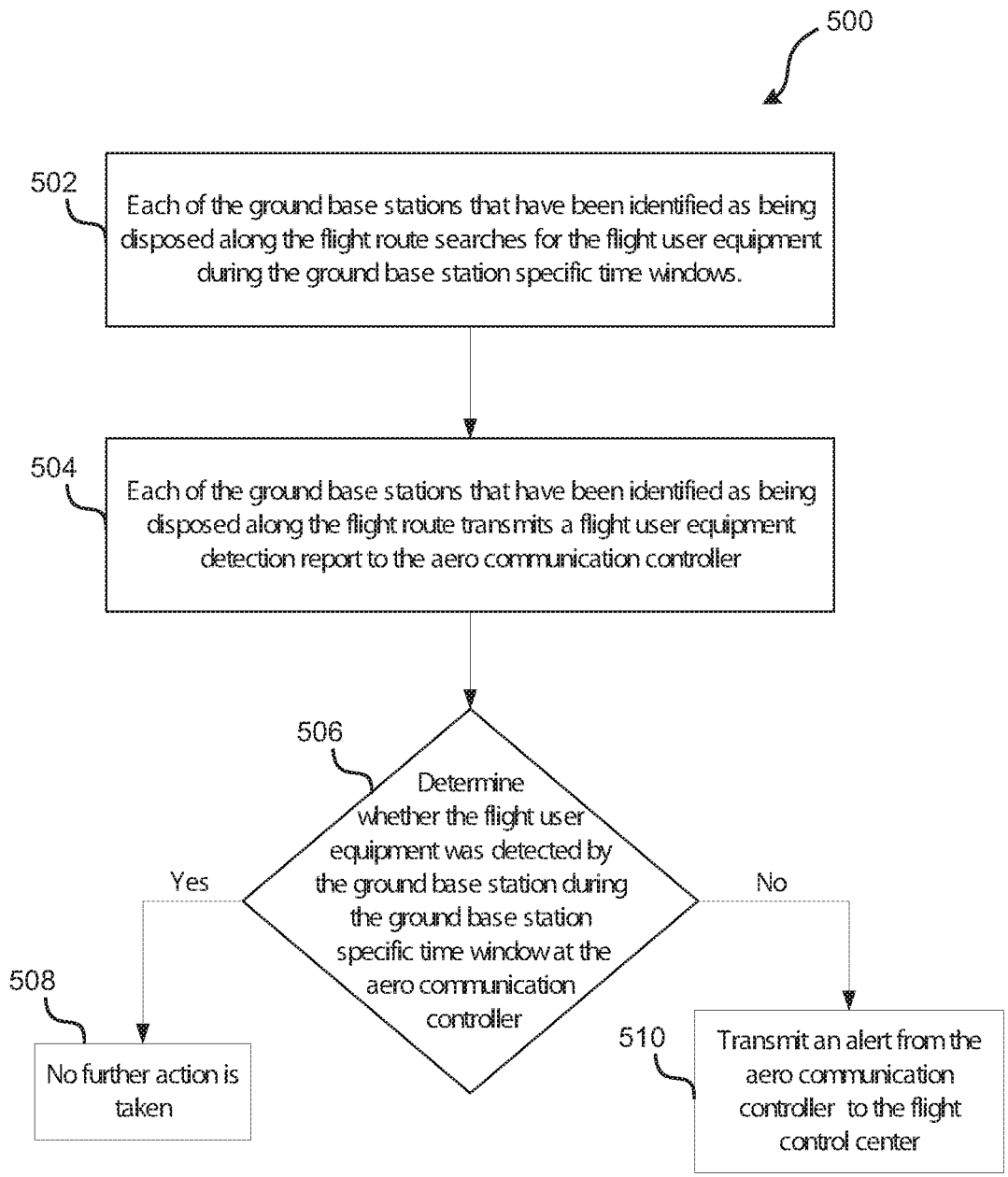
FIG. 5 is a flow diagram representation of an example of a method of using an embodiment of an aircraft communication system to track an aircraft along a flight route.

Referring to FIG. 5 is a flow diagram representation of an example of a method of using an embodiment of an aircraft communication system to track an aircraft along a flight route is shown. The tracking of the aircraft 102 by the aero communication controller 106 may be used for security, scheduling, or other purposes. If the flight user equipment 104 is not detected by one of the ground base stations 112a, 112b, 112c on the list of ground base stations identified as being disposed along the flight route 116 within the expected time window, that ground base station 112a, 112b, 112c reports the event to the aero communication controller 106.

In an embodiment, the aero communication controller 106 issues an alert to the flight control center when one of the ground base stations 112a, 112b, 112c on the list of ground base stations disposed along the flight route 116 fails to detect the flight user equipment 104 within the expected time window. In an embodiment, the aero communication controller 106 issues the alert to the flight control center via the communication interface 306. In an embodiment, the flight tracker 312 issues the alert to the flight control center. In an embodiment, the alert is an alarm.

As mentioned above, the aero communication controller 106 transmitted the flight resource reservation request to each of the ground base stations 112a, 112b, 112c that the aero communication controller 106 identified as being disposed along the flight route 116 of the aircraft 102. The flight resource reservation request for each ground base station 112a, 112b, 112c identified the time window that the flight user equipment 104 is expected to be within communication range of that ground base station 112a, 112b, 112c. In an embodiment, the flight resource reservation request included flight identification data.

At 502, each of the ground base stations 112a, 112b, 112c that have been identified as being disposed along the flight route 116 searches for the flight user equipment 104 during the ground base station specific time window. In an embodiment, the flight user equipment 104 generates an uplink signal as the aircraft 102 travels along the flight route 116. In an embodiment, the flight tracking coordinator 210 generates the uplink signal.

Each of the ground base stations 112a, 112b, 112 is configured to receive the uplink signal generated by the flight user equipment 104 as the flight user equipment 104 falls within the communication range of each of the ground base station 112a, 112b, 112c. At 504, each of the ground base stations 112a, 112b, 112c transmits a flight user equipment detection report to the aero communication controller 106 indicating whether the ground base station 112a, 112b, 112c detected the flight user equipment 104 during the ground base station specific time window on a real time basis. In an embodiment, the flight user equipment detections reports generated by the ground base stations 112a, 112b, 112c are received at the flight tracker 312.

At 506, the aero communication controller 106 determines whether the flight user equipment 104 was detected by the ground base station 112a, 112b, 112c during the ground base station specific time window based on the received flight user equipment detection reports. In an embodiment, the flight tracker 312 determines whether the flight user equipment 104 was detected by the ground base station 112a, 112b, 112c during the ground base station specific time window based on the received flight user equipment detection reports.

If the aero communication controller 106 determines that the flight user equipment 104 was detected by the ground base station 112a, 112b, 112c during the ground base station specific time window, no further action is taken at 508. In an embodiment, if the flight tracker 312 determines that the flight user equipment 104 was detected by the ground base station 112a, 112b, 112c during the ground base station specific time window, no further action is taken at 508.

If the aero communication controller 106 determines that that the flight user equipment 104 was not detected by the ground base station 112a, 112b, 112c during the ground base station specific time window, the aero communication controller 106 transmits an alert to the flight control center via the communication interface 306 at 510. In an embodiment, if the flight tracker 312 transmits an alert to the flight control center. In an embodiment, the alert is an alarm.

In an embodiment, if one of the ground base stations 112a, 112b, 112c detects the flight user equipment 104 outside the ground base station specific time window, that ground base station 112a, 112b, 112c reports the time that the flight user equipment 104 was detected to the aero communication controller 106. The aero communication controller 106 calculates an updated location and speed of the aircraft 102 based on the received time. The aero communication controller 106 transmits an updated flight resource reservation request to each of the ground base stations 112a, 112b, 112c on the list of ground base stations on the remainder of the flight route 116. The updated flight resource reservation request includes updated ground base station specific time windows indicating when each of the ground base stations 112a, 112b, 112c can expect to detect the flight user equipment 104.

In an embodiment, each of the ground base stations 112a, 112b, 112c on the list of ground stations measures the uplink signal generated by the flight user equipment 104 at the same time or at different times and extracts one or more of doppler, distance and other flight related information for reporting to the aero communication controller 106. The aero communication controller 106 uses one or more of doppler, distance and other flight related information to calculate the speed and location of the aircraft 102.

While a series of steps have been described in connection with the method 500, a fewer number of the described steps and/or additional steps may be performed. Furthermore, while the steps have been described in a particular order, the steps in method 500 may be performed in a different order.

Figure 6:
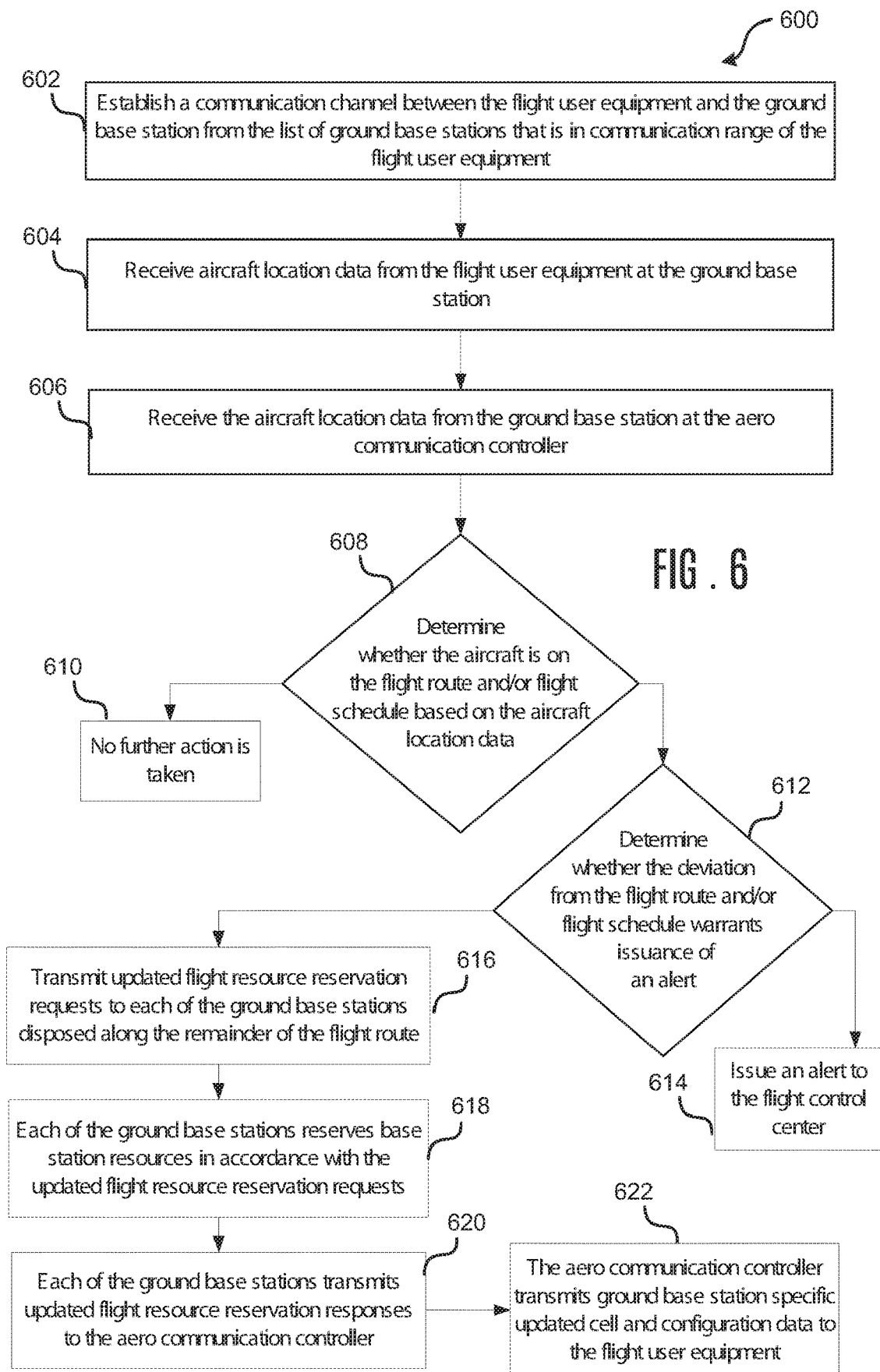
FIG. 6 is a flow diagram representation of an example of a method of using an embodiment of an aircraft communication system to track an aircraft along a flight route.

Referring to FIG. 6 a flow diagram representation of an example of a method 600 of using an embodiment of an aircraft communication system to track an aircraft 102 along a flight route 116 is shown. The tracking of the aircraft 102 by the aero communication controller 106 may be used for security, scheduling, or other purposes At 602, the flight user equipment 104 establishes a communication channel between the flight user equipment 104 and a ground base station 112a from the list of ground base stations that is within communication range of the fight user equipment 104. In an embodiment, the flight tracking coordinator 210 establishes the communication channel between the flight user equipment 104 and the ground base station 112a from the list of ground base stations that is within communication range of the fight user equipment 104. In an embodiment, the flight user equipment 104 performs a resource reservation call set up with the ground base station 112a, 112b, 112c to establish the communication channel between the flight user equipment 104 and the ground base station 112a. The flight user equipment 104 performs the resource reservation call set up with each of the ground base stations 112a, 112b, 112c on the list of ground base stations as each of the ground base stations 112a, 112b, 112c come within communication range of the flight user equipment 104 as the aircraft travels along the flight route 116.

At 604, the ground base station that is within communication range of the flight user equipment 104 receives aircraft location data from the flight user equipment 104. In an embodiment, the aircraft location data is transmitted to the ground base station 112a, 112b, 112c by the flight tracking coordinator 210. At 606, the ground base station 112a, 112b, 112c transmits the received aircraft location data to the aero communication controller 106. In an embodiment, the aircraft location data is received at the flight tracker 312.

In an embodiment, the flight user equipment 104 periodically reports location data to the aero communication controller 106 via the ground base station 112a, 112b, 112c that is in communication range of the flight user equipment 104. In an embodiment, the flight tracking coordinator 210 periodically reports location data to the aero communication controller 106 via the ground base station 112a, 112b, 112c that is in the communication range of the flight user equipment 104.

In an embodiment, the flight user equipment 104 generates an uplink signal. In an embodiment, the flight tracking coordinator 210 generates the uplink signal. The uplink signal is received at the aero communication controller 106 via the ground base station 112a, 112b, 112c that is in the communication range of the flight user equipment 104. In an embodiment, the uplink signal is received by the flight tracker 312. In an embodiment, the uplink signal is the aircraft location data.

In an embodiment, the flight user equipment 104 generates and transmits aircraft location data identifying the location of the aircraft 102 to the aero communication controller 106 via the ground base station 112a, 112b, 112c that is in the communication range of the flight user equipment 104. In an embodiment the flight tracking coordinator 210 generates and transmits the aircraft location data identifying the location of the aircraft 102 to the aero communication controller 106 via the ground base station 112a, 112b, 112c that is in the communication range of the flight user equipment 104.

At 608, the aero communication controller 106 determines whether the aircraft 102 is on the flight route 116 based on the received aircraft location data. In an embodiment, the flight tracker 312 determines whether the aircraft 102 is on the flight route 116 based on the received aircraft location data. In an embodiment, the aero communication controller 106 determines whether the aircraft 102 is on the flight route 116 in accordance with the flight schedule based on the received aircraft location data. In an embodiment, the flight tracker 312 determines whether the aircraft 102 is on the flight route 116 in accordance with the flight schedule based on the received aircraft location data.

If the aero communication controller 106 determines that the aircraft 102 is on the flight route 116 in accordance with the flight schedule, no further action is taken at 610. If the aero communication controller 106 determines that the aircraft 102 is not on the flight route 116 in accordance with the flight schedule, the aero communication controller 106 determines whether the deviation from the flight route 116 and/or the flight schedule warrants the issuance of an alert to the flight control center at 612. In an embodiment, the flight tracker 312 determines whether the deviation from the flight route 116 and/or the flight schedule warrants the issuance of an alert to the flight control center.

If the aero communication controller 106 determines that the deviation from the flight route 116 and/or the flight schedule warrants the issuance of an alert to the flight control center, the aero communication controller 106 issues the alert to the flight control center at 614. In an embodiment, if the flight tracker 312 determines that the deviation from the flight route 116 and/or the flight schedule warrants the issuance of an alert to the flight control center, the aero communication controller 106 issues the alert to the flight control center at 614. In an embodiment, the alert is an alarm.

If the aero communication controller 106 determines that the deviation from the flight route 116 and/or the flight schedule fails to warrant the issuance of an alert, the aero communication controller 106 transmits updated flight resource reservation requests to reserve base station resources for use by the flight user equipment 104 in accordance with the updated flight route and/or flight schedule to each of the ground base stations 112a, 112b, 112c that have been identified as being disposed along the remainder of the flight route 116 at 616. The updated flight resource reservation requests are ground base station specific and identifies the updated time window that the flight user equipment 104 is expected to be within communication range of each of the ground base station 112a, 112b, 112c.

At 618, each of the ground base stations 112a, 112b, 112c reserves ground base station resources in accordance with the received updated flight resource reservation requests. At 620, each of the ground base stations 112a, 112b, 112c transmits an updated flight resource reservation response to the aero communication controller 106. In an embodiment, the updated flight resource reservation response received from each of the ground base stations 112a, 112b, 112c includes updated ground base station specific cell and configuration data. The aero communication controller 106 transmits the ground base station specific updated cell and resource configuration data to the flight user equipment 104 at 622.

The cell for flight communication may be different from a regular cell. The cell may be modified and optimized for flight communication.

There can be at least three types of cells: (i) dedicated flight cell, which only serves the flight UEs; (ii) dedicated non-flight cell, which only serves the regular UEs or serves the FUE as a regular UE; and (iii) shared cell, which serves both FUEs and regular UEs. In a preferred embodiment, the FUE connects to the dedicated non-flight cell only if it cannot connect with other two types of cells. In this case, the FUE will keep searching the other two types of cells.

Figure 7:
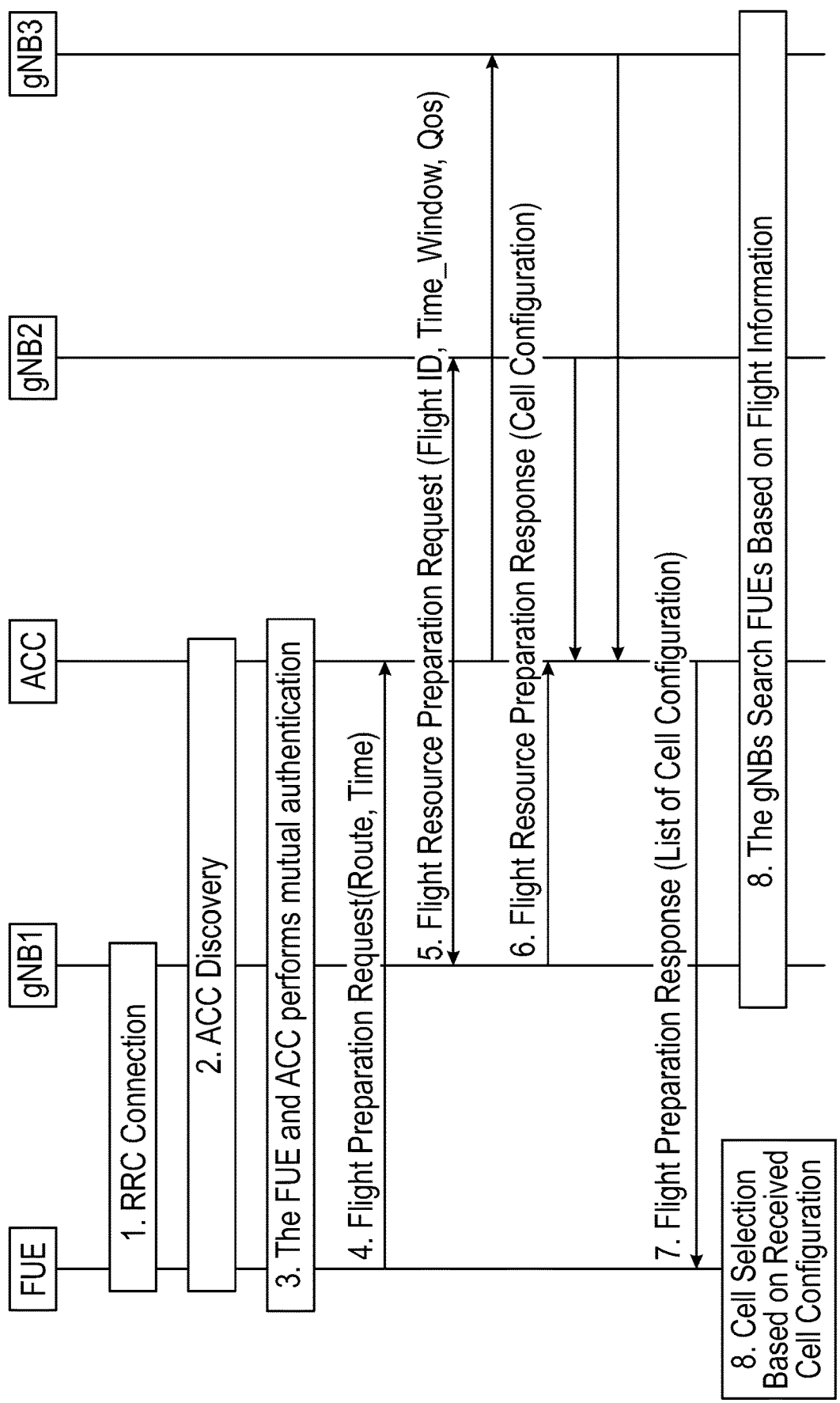
FIG. 7 shows the message flow of resource reservation for a FUE.

FIG. 7 shows the message flow of resource reservation for a FUE. Here: (i) the FUE and gNB1 performs RRC connection setup; (ii) the FUE is preconfigured with ACC domain name or can perform ACC discovery; (3) the FUE communicates with the ACC and performs mutual authentication; (iv) upon successfully antiquation, the FUE may activate a Data Network Name (DNN) and sends its route and schedule information to the ACC in Flight Preparation Request; (v) the ACC identifies the gNBs in the flight's route and sends a Flight Resource Preparation Request to these gNBs; (vi) the gNBs reserve resource for the FUE and reply the ACC with the cell and resource configuration; (vii) the ACC sends the cell list and configuration to the FUE; and (viii) the FUE searches the cells based on received configuration. The gNBs searches FUE based on received time window and flight_ID information. The cell and resource configuration may include, without limitation: geographic location, frequency, cell ID (PCI, CGI), beam information, similar information or a combination thereof;

The FUE can be either pre-configured or indicated by the ACC in step 7 of FIG. 7 with the cells that provide optimized flight communications.

Figure 8:
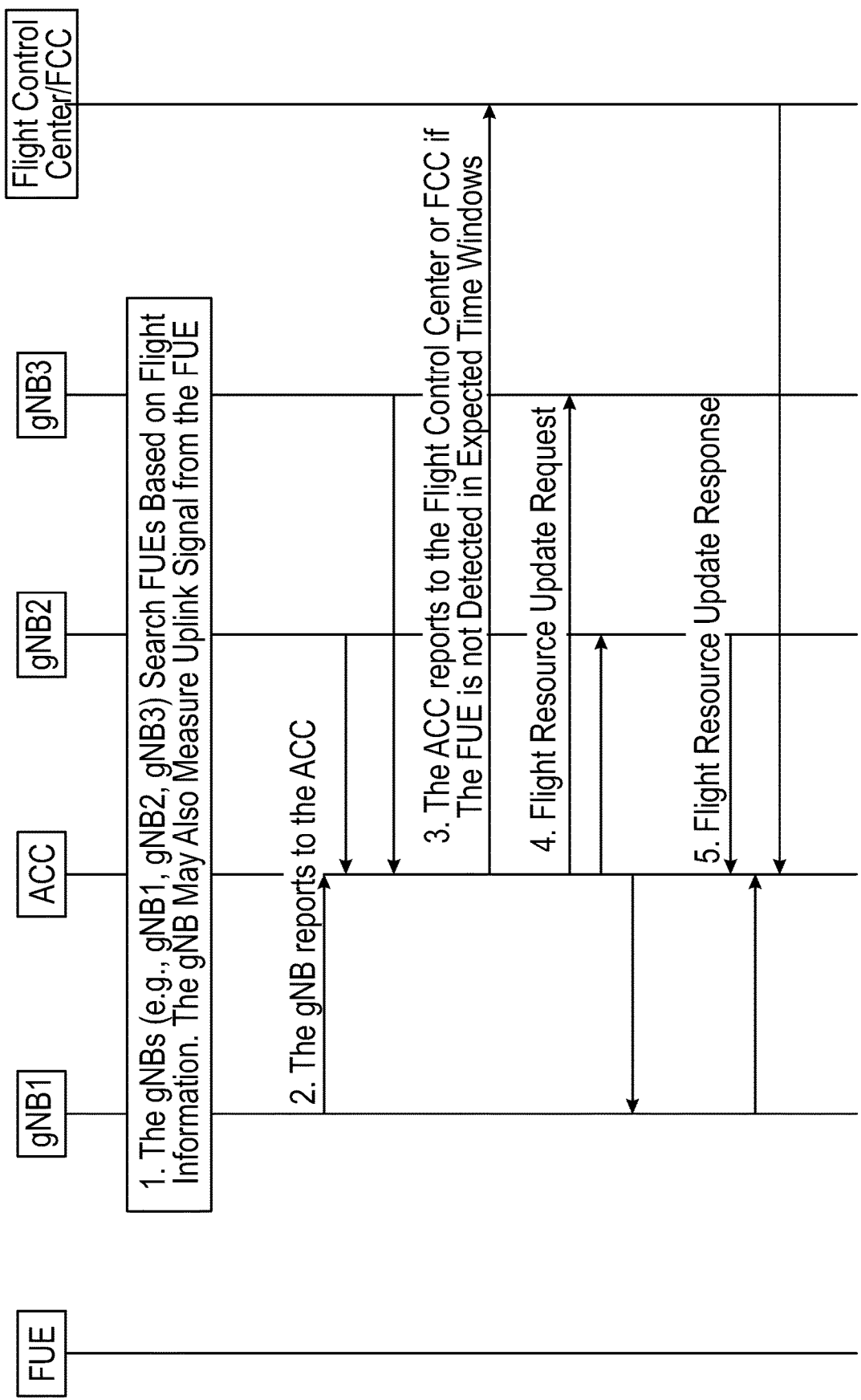
FIG. 8 shows network-based flight tracking, resource update, and report call flow.

In addition, the ACC resource reservation-based mechanism can be used to track a flight or drone for security, scheduling and other purposes, as a complementary way of radar. If a FUE is not detected by the gNB on expected time window, the gNB can report the event to the ACC. The ACC may further send the alarm to flight regulation. Each gNB may also measure the uplink signal at the same time or at a different time and may extract doppler, distance, and other information of the flight and report to the ACC for the ACC to calculate the location and speed of the flight. FIG. 8 shows network-based flight tracking, resource update, and report call flow.

Figure 9:
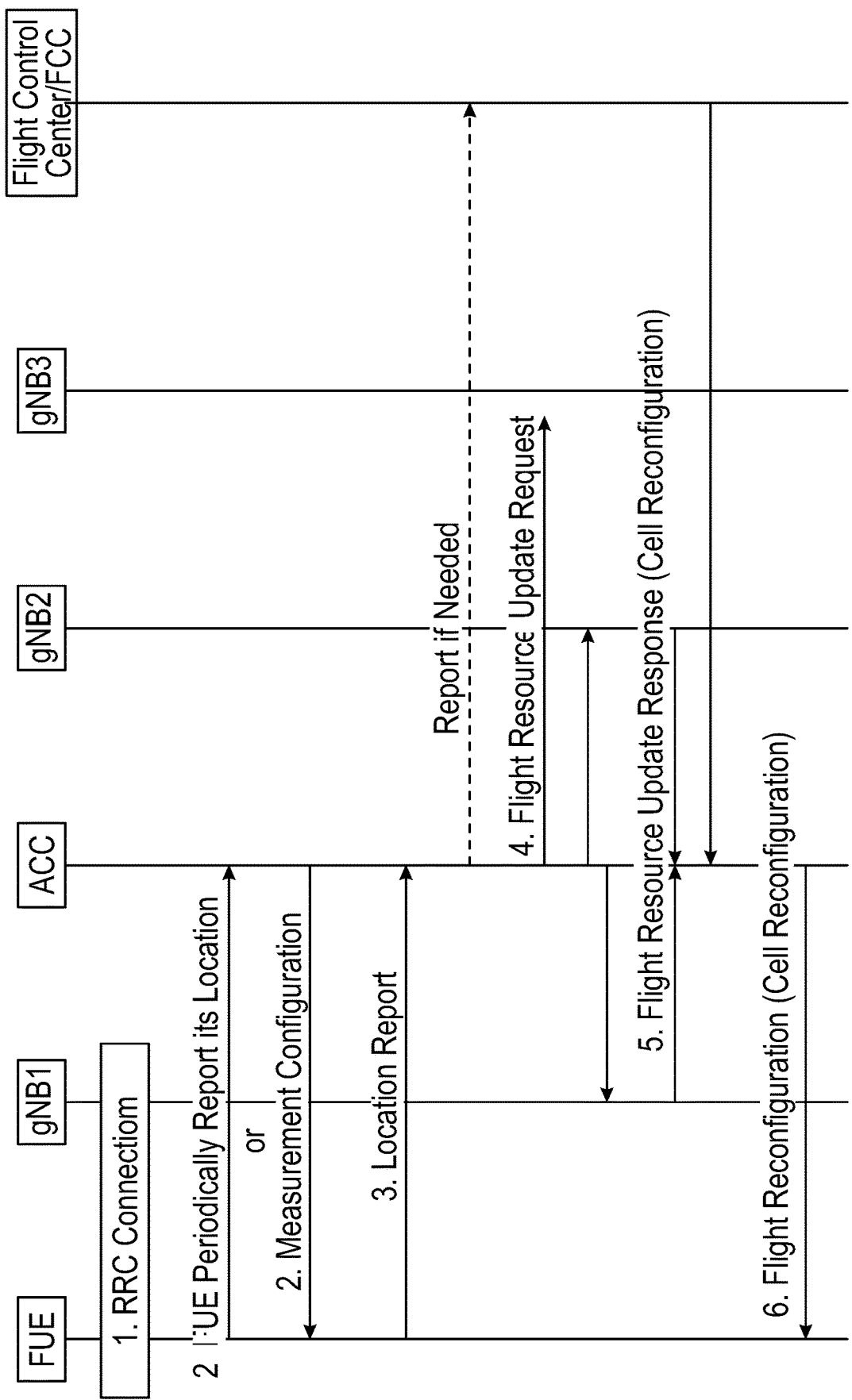
FIG. 9 shows FUE assisted flight tracking, resource update, and report call flows.

The FUE should report its GNSS location either periodically or per request based on ACC configuration. ACC may use this information to adjust the resource reservation in each gNB. FIG. 9 shows FUE assisted flight tracking, resource update, and report call flows.

Figures 10, 11:
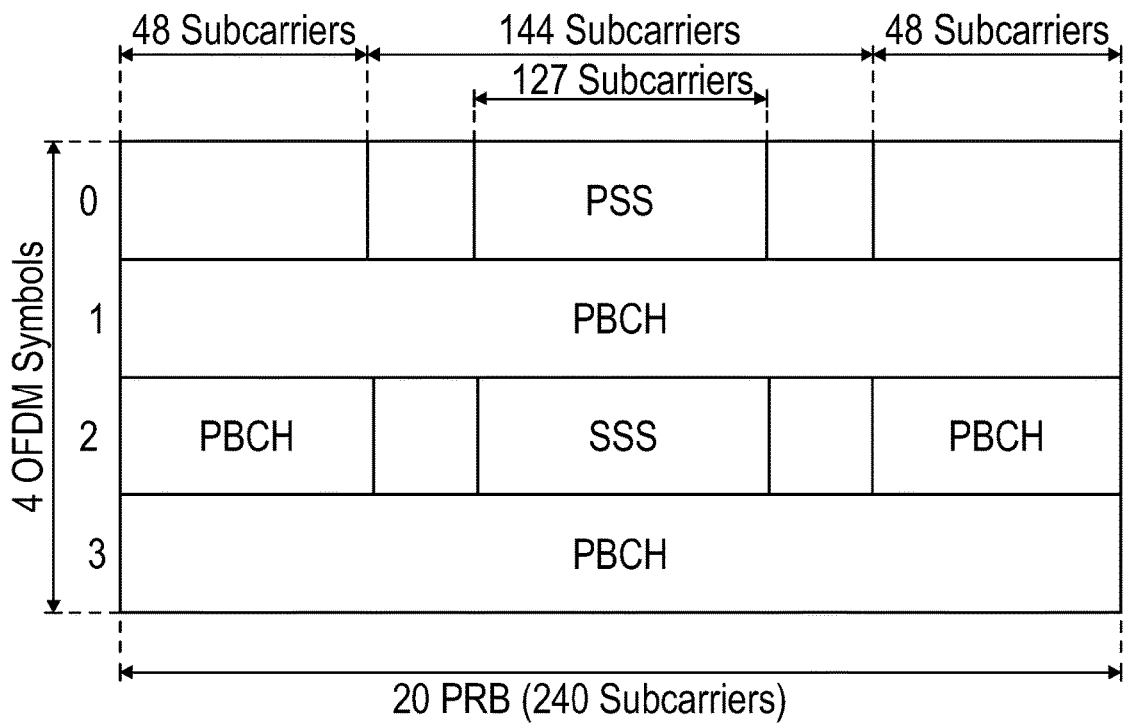
FIG. 10 shows spare bits used in master information blocks as an indicator for use in accordance with the disclosed methods.
FIG. 11 shows conventional synchronization signal block (SSB) structure.

In addition, the following options can also be used via lower layer signaling:

in dedicated flight cell deployment scenario, the gNB can use spare bits in master information block (MIB) to indicate flight use, see for example FIG. 10. The gNB indicates cell barred to normal UEs; and in dedicated non-flight cell deployment, the gNB can use spare bits in MIB to indicate no service optimization to FUEs.

Figure 12:
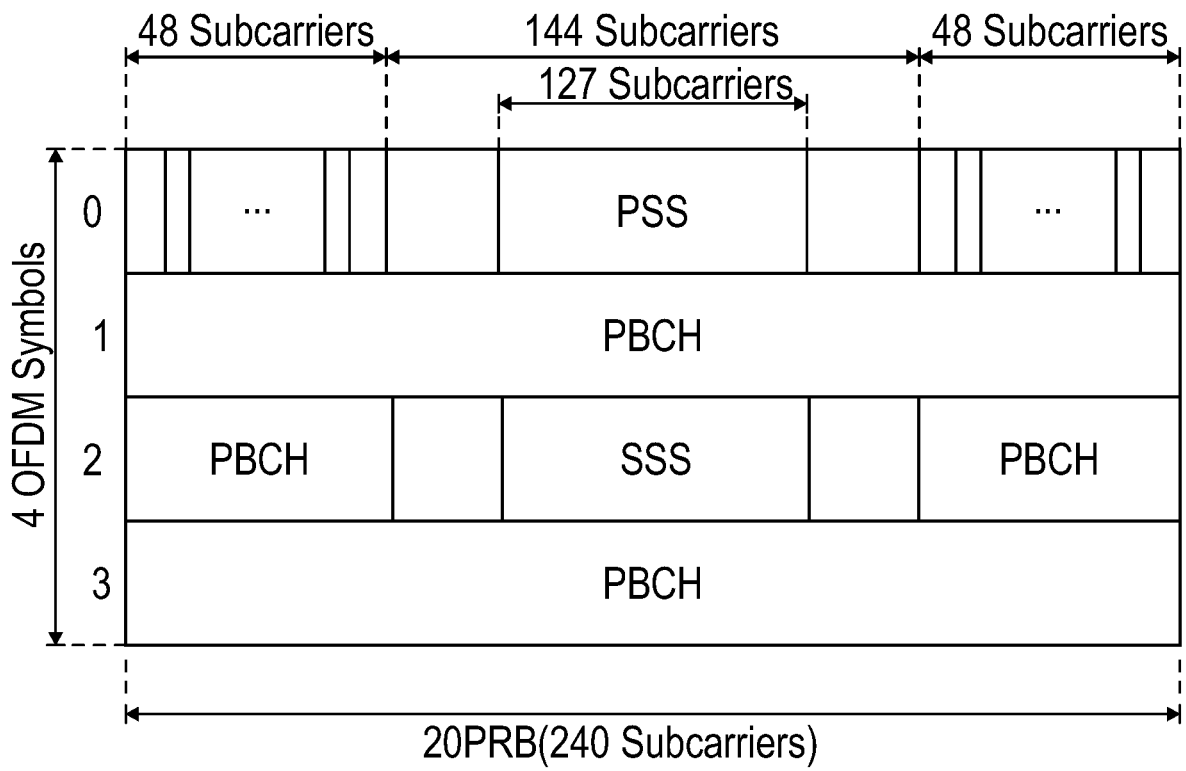
FIG. 12 shows a novel proposed SSB structure.

For shared cell deployment scenario, there can be multiple options for the gNB to indicate supporting flight communication, including:

Option 1: used spare bit in MIB to indicate flight use in addition to normal use;

Option 2: propose using unused REs in Synchronization Signal and PBCH Block (SSB) to transmit physical layer signaling to indicate the following (See FIGS. 11-12):

the gNB supports flight communication;

information on optimization to different types of flight UEs;

unused REs in SSB to carry the above information can follow cell specific RE mapping and cell specific scrambling; and Option 3: add a field in SIB1 to indicate flight use.

UE differentiation can be applied to shared cell deployment, or to dedicated flight cell deployment. It can be supported with and without 3GPP standard change.

In 3GPP standard change case, the UE differentiation can be supported as follows:

Subscription: usage type, or slice indication, or any other indicator configured in UDM (User Data Management)/HSS;

RRC: include flight indication in RRC, e.g. Msg3 or Msg5, or UE capability report;

NAS: include flight indication in Registration Request;

In no standard change case, the FUE is same as normal UE, e.g. treated as mobile phone in 3GPP defined signaling procedures and subscription. The additional function can be supported via ACC for FUE optimization, for example:

the FUE is subscribed to flight communication via ACC;

the ACC informs gNB that this is a flight with one or more types instead of a regular UE; and/or the ACC requests gNB to provide additional function and control.

While a series of steps have been described in connection with the method 600, a fewer number of the described steps and/or additional steps may be performed. Furthermore, while the steps have been described in a particular order, the steps in method 600 may be performed in a different order.

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, embedded devices, etc.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for reserving bandwidth for use with in-flight communication, comprising:

establishing a communication channel between a flight user equipment and a network entity wherein the network entity comprises an aero communication controller, a radio access node, or a combination thereof;

performing a radio resource control connection between the flight user equipment and the network entity;

performing a mutual authentication between the flight user equipment and the network entity;

transmitting, from the flight user equipment to the network entity, a flight resource preparation request associated with a select flight, the flight resource preparation request comprising: a flight route associated with the select flight, or the flight route and a flight schedule associated with the select flight; and receiving, at the flight user equipment, a flight resource preparation response, the flight resource preparation response comprising a list of a plurality of network nodes identified by the network entity as being disposed along the flight route;

wherein at least one of the flight user equipment and the network entity is configured to select, from the flight resource preparation response, the plurality of network nodes or a sub-set thereof for allocating in-flight communication resources.

2. The method of claim 1, further comprising: transmitting, from the flight user equipment to the network entity, a flight user equipment type associated with the select flight, the flight user equipment type being one from the group consisting of: military, civilian, or drone.

3. The method of claim 2, wherein the flight user equipment type is transmitted to the network entity via one of: radio resource control signaling or non-access stratum signaling.

4. The method of claim 1, further comprising: transmitting, from the flight user equipment to the network entity, a location of the flight user equipment.

5. The method of claim 4, wherein the location of the flight user equipment is transmitted periodically during the select flight, wherein the location of the flight user equipment is transmitted upon the flight user equipment receiving a request for location initiated from the network entity.

6. The method of claim 1, further comprising: receiving, at the flight user equipment, a node type associated with each of the plurality of network nodes, the node type being one from the group consisting of: dedicated flight cell; dedicated non-flight cell; or shared cell.

7. The method of claim 6, wherein the node type is received at the flight user equipment by one of: subscription, pre-configuration, master information block, synchronization signal, and system information block.

8. A method for reserving bandwidth for use with in-flight communication, comprising:
   establishing a communication channel between a flight user equipment and a network entity;
   performing a radio resource control connection between the flight user equipment and the network entity;
   performing a mutual authentication between the flight user equipment and the network entity;
   receiving, at the network entity, a flight resource preparation request associated with a select flight, the flight resource preparation request comprising: a flight route associated with the select flight, or the flight route and a flight schedule associated with the select flight; and
   transmitting, from the network entity to the flight user equipment, a flight resource preparation response, the flight resource preparation response comprising a list of a plurality of network nodes identified by the network entity as being disposed along the flight route;
   wherein at least one of the flight user equipment and the network entity is configured to select, from the flight resource preparation response, the plurality of network nodes or a sub-set thereof for allocating in-flight communication resources.

9. The method of claim 8, wherein the network entity comprises an aero communication controller, a radio access node, or a combination thereof.

10. The method of claim 8, further comprising: receiving, at the network entity, a flight user equipment type associated with the select flight, the flight user equipment type being one from the group consisting of: military, civilian, or drone.

11. The method of claim 10, wherein the flight user equipment type is transmitted to the network entity via radio resource control signaling or non-access stratum signaling.

12. The method of claim 8, further comprising: receiving, at the network entity, a location of the flight user equipment.

13. The method of claim 12, wherein the location of the flight user equipment is received periodically during the select flight, or wherein the location of the flight user equipment is received in response to a request for location initiated from the network entity.

14. The method of claim 8, further comprising: transmitting, from the network entity to the flight user equipment, a node type associated with each of the plurality of network nodes, the node type being one from the group consisting of: dedicated flight cell; dedicated non-flight cell; or shared cell.

15. The method of claim 14, wherein the node type is transmitted in one of: subscription, pre-configuration, master information block, synchronization signal, and system information block.

16. The method of claim 8, further comprising:
   establishing a communication channel between the aero communication controller and the radio access node;
   transmitting, from the radio access node to the aero communication controller, the flight resource preparation request, radio access node information, and up to each of: a flight user equipment type, a flight user equipment location, or a combination thereof;
   receiving, at the radio access node, the flight resource preparation response, a flight resource update, or a combination thereof; and
   transmitting the flight resource preparation response, flight resource update, or combination thereof to the flight user equipment.

17. The method of claim 9, wherein the aero communication controller comprises a distributed system.

* * * * *